United States Patent [19]

Forster et al.

[11] 3,774,734
[45] Nov. 27, 1973

[54] HYDRODYNAMIC BRAKE FOR VEHICLES, ESPECIALLY MOTOR VEHICLES

[75] Inventors: Hans-Joachim M. Forster, Stuttgart; Wolfgang Zaiser, Althutte (Wurtt); Hans Hanke; Friedrich Bultmann, both of Stuttgart, all of Germany

[73] Assignee: Daimler-Benz Aktiengesellshaft, Stuttgart-Untertuerkheim, Germany

[22] Filed: Apr. 16, 1971

[21] Appl. No.: 134,641

[30] Foreign Application Priority Data
Apr. 18, 1970 Germany............. P 20 18 652.1

[52] U.S. Cl....................... 188/296, 60/337, 60/347
[51] Int. Cl............................................. F16d 57/02
[58] Field of Search........................... 188/290, 296; 60/337, 347

[56] References Cited
UNITED STATES PATENTS

| 3,180,692 | 4/1965 | Muller | 188/296 X |
| 2,963,118 | 12/1960 | Booth et al. | 60/54 X |
| 3,283,859 | 11/1966 | Bertram et al. | 188/290 |
| 3,512,616 | 5/1970 | Bessiere | 188/296 X |
| 3,650,358 | 3/1972 | Bessiere | 188/296 |

Primary Examiner—George E. A. Halvosa
Attorney—Craig, Antonelli & Hill

[57] ABSTRACT

A hydrodynamic brake for vehicles, especially for motor vehicles with at least one fixed blade wheel and one rotating blade wheel rotating with the drive of the vehicle, in which a filling pump for filling the hydrodynamic working circulatory system rotates also constantly with the drive; the filling pump is adapted to be connected by way of a regulating valve either with the oil sump or with the outlet of the hydrodynamic brake and the pressure is thereby automatically controllable corresponding to the pressure in the brake circuit of the vehicle; a closure valve is also associated with the brake which opens up the external circulatory sysem of the hydrodynamic brake only above a predetermined pressure at the inlet or outlet of the hydrodynamic brake and closes the same below the predetermined value.

22 Claims, 4 Drawing Figures

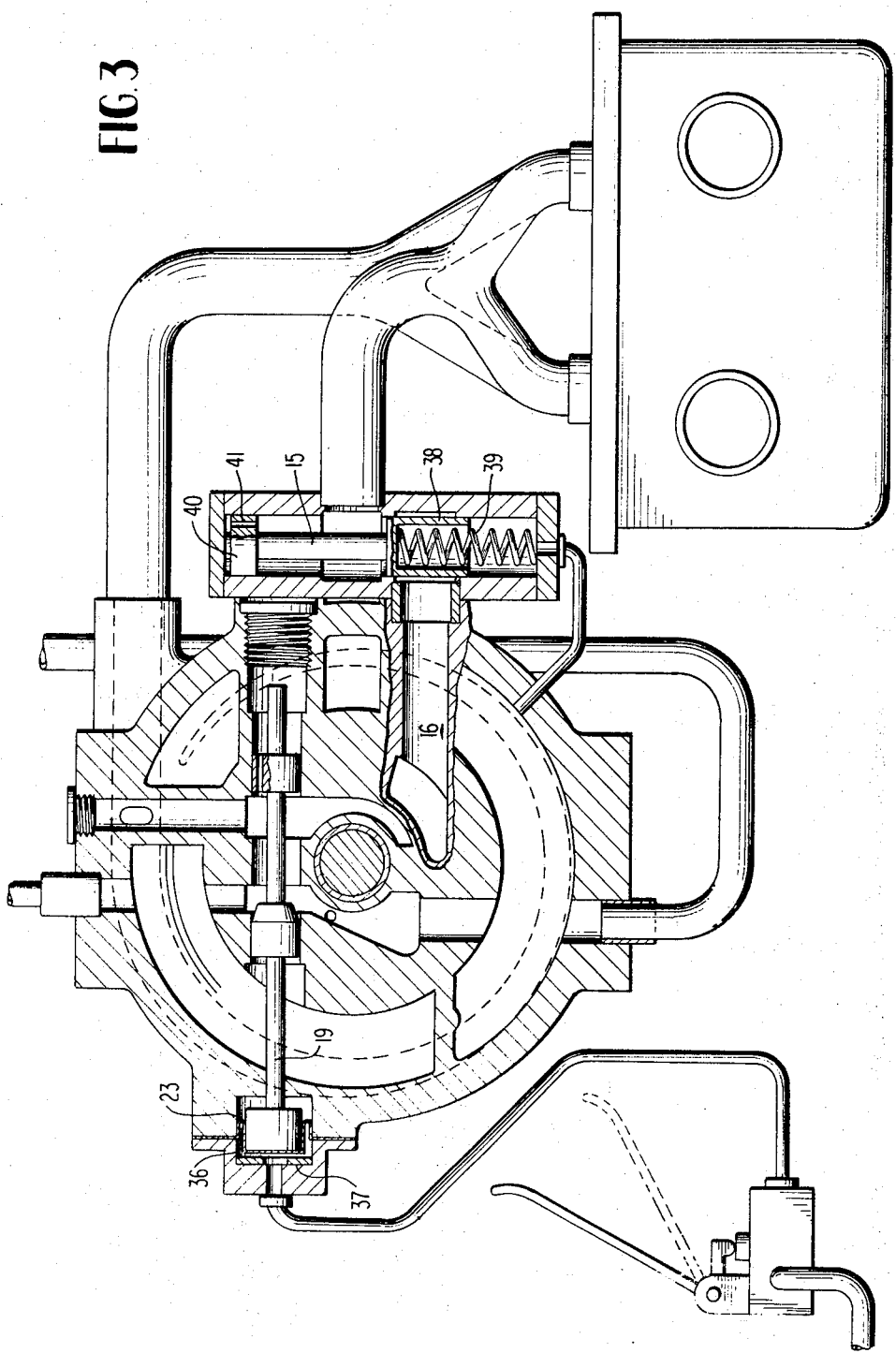

FIG.2
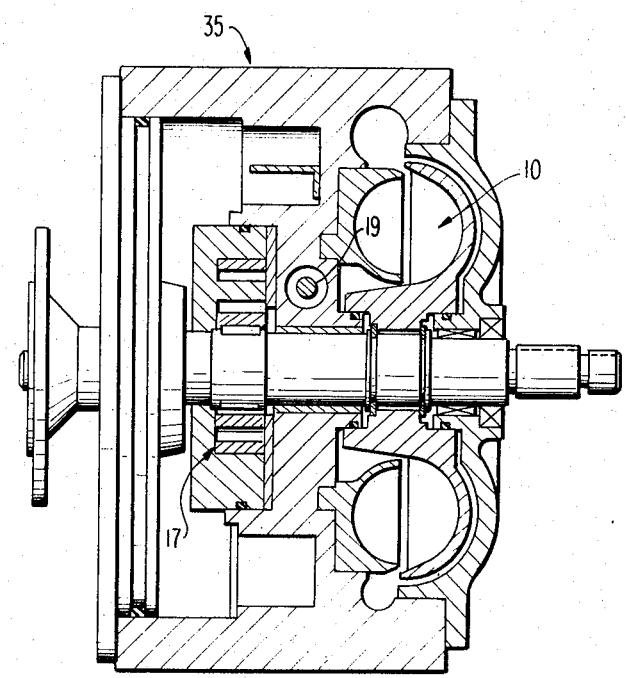
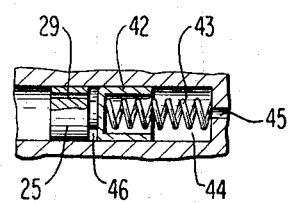
FIG.4
INVENTORS
HANS-JOACHIM M. FORSTER, WOLFGANG ZAISER
HANS HANKE, FRIEDRICH BULTMANN
BY Craig, Antonelli, Stewart & Hill
ATTORNEYS

HYDRODYNAMIC BRAKE FOR VEHICLES, ESPECIALLY MOTOR VEHICLES

The present invention relates to a hydrodynamic brake (retarder) for vehicles, especially for motor vehicles with at least one fixed blade wheel and one blade wheel rotating with the drive, whereby a filling pump for filling the hydrodynamic working circulation rotates also constantly in unison with the drive.

With retarders of the aforementioned type, the hydrodynamic working circulation is generally filled during the braking and is emptied during the normal operation. The problem with these prior art retarders resides in being able to cause the filling or emptying operation to proceed as rapidly as possible in order that the response time of the retarer is reduced as much as possible to a minimum. Additionally, one aims in connection therewith to empty or fill possibly only the working circulatory system itself in order that the quantity of the oil to be transported during the filling or emptying does not become excessively large.

The present invention is concerned with the task to provide a solution to this problem. It solves the underlying problems with the retarders of the aforementioned type in that the filling pump is adapted to be connected by way of a regulating valve either with the oil sump or with the outlet (discharge) of the hydrodynamic brake and the pressure is thereby regulatable automatically corresponding to the pressure in the brake circuit of the vehicle, and in that a cut-off or closure valve is coordinated to the hydrodynamic brake which opens up the external circulatory system of the hydrodynamic brake, possibly leading by way of a cooler, only above a predetermined pressure at the inlet thereof and closes the same below this predetermined value.

The construction according to the present invention offers the advantage that the closure valve closes the external circulatory system of the hydrodynamic brake so that the same cannot be sucked empty by the vacuum occurring in the retarder. Consequently, it remains filled so that during the next braking operation only the working circulatory system itself has to be filled. The measures to be described more fully hereinafter act in the same sense. As to the rest, the present invention provides that both the regulating valve as also the closure or cut-off valve and the filler pump are structurally combined with the retarder itself.

In one embodiment of the present invention, the closure valve is coordinated to the inlet in the hydrodynamic brake and is adapted to be acted upon, on the one hand, by a spring force, and, on the other, by the pressure at the inlet of the retarder. In detail, it is proposed therefore that the closure valve is constructed as piston slide valve member with two partial pistons or spools and that the spring is disposed at the end face of a partial piston which in the pressureless condition closes the line from the cooler whereas the end face of the other partial piston is in communication by way of a bore with the space between the two partial pistons which is constantly in communication with the inlet of the hydrodynamic brake. In this manner, the other partial piston acts as control piston which upon exceeding a certain pressure at the retarder inlet, that is, predetermined by the spring on the other side, opens up the line from the cooler.

Another possibility resides in that according to the present invention, the closure valve is coordinated to the inlet of the hydrodynamic brake and is adapted to be acted upon against a spring pressure by the pressure at the cooler outlet or at the outlet of the hydrodynamic brake. It is thereby proposed in detail that the closure valve be constructed as piston slide valve with two partial pistons or spools, whose one partial piston closes the inlet to the brake under a spring force and whose other partial piston is adapted to be acted upon by the pressure at the cooler outlet by way of a bore. The operation is the same in principle as described above, only the pressure at the retarder outlet or at the cooler outlet now serves as guide magnitude.

It is further proposed by the present invention that the regulating valve is constructed as piston slide valve and includes a first partial piston or spool adapted to be acted upon by the pressure in the vehicle brake circuit, a second partial piston or spool controlling the discharge into the sump and a third partial piston or spool adapted to be acted upon by the pressure at the outlet of the hydrodynamic brake. A roller diaphragm is thereby appropriately coordinated to the first partial piston and the end face of the cylinder space receiving this first partial piston is provided with an elastic abutment. The second partial piston thereby appropriately passes over into a conical part in order to achieve a more soft control. The third partial piston is provided with a throttle bore in order to produce, on the one hand, the pressure for the control on its end face and, on the other, a damping of its movement. A further feature of the present invention resides in that the effective piston surface of the first partial piston is at a predetermined ratio to that of the third partial piston, i.e., that thus a corresponding force transmission results between the pressure in the vehicle brake circuit and the pressure at the hydrodynamic brake.

In a further development of the inventive concept, a spring is so coordinated to the first partial piston that a slight pressure is constantly maintained at the outlet of the hydrodynamic brake. This spring can be disposed on the diaphragm side of the first partial piston. An arrangement at another place, as well as a representation of this force not as a spring, but, for example, as differential pressure, would also be feasible and within the scope of the present invention. However, it is achieved thereby in every case that a predetermined pressure remains at the retarder outlet, i.e., only the working circulatory system becomes empty in each case but not, for example, the pipe line or the spiral surrounding the retarder.

Another possibility to decrease the response time of the retarder resides in that according to the present invention a bore is so coordinated to the space on the end face of the third partial piston that it is adapted to be closed after a predetermined path by the third partial piston. In this manner, the movement of the piston slide valve serving as regulating valve takes place at first without throttling, i.e., therefore relatively rapidly so that a pressure builds up very rapidly and the retarder is filled. Upon transversal of this path, the usual throttling then takes place, i.e., a damping. Another possibility for achieving quite a similar effect resides in that according to the present invention a spring-loaded additional piston is arranged in the space on the end side of the third partial piston and the space disposed opposite the third partial piston is discharged to zero. In this manner, the entire piston slide valve acting as regulating valve at first moves into its end position—when pressure is being built up in the vehicle brake circuit—so that the outlet is completely closed. Only during the pressure build-up in the space between the third partial piston and the additional piston—which takes place relatively slowly by reason of the throttle bore—the entire piston slide valve returns to its normal regulating position.

Accordingly, it is an object of the present invention to provide a hydrodynamic brake for vehicles, especially for motor vehicles, which avoids by simple means the aforementioned shortcomings and drawbacks encountered in the prior art.

Another object of the present invention resides in a hydrodynamic brake for vehicles which permits a substantial reduction of the response time of the retarder.

A further object of the present invention resides in a hydrodynamic brake for vehicles which minimizes the quantity of oil to be handled during filling and emptying of the system.

Still, a further object of the present invention resides in a hydrodynamic brake for vehicles which is simple in construction, requires relatively few parts and can be readily accommodated in a small space.

A further object of the present invention resides in a retarder for motor vehicles which is of extraordinary compact design.

These and further objects, features, and advantages of the present invention will become more obvious from the following description when taken in connection with the accompanying drawing which shows, for purposes of illustration only, several embodiments in accordance with the present invention, and wherein:

FIG. 2 is a longitudinal cross-sectional view through a retarder construction in accordance with the present invention;

FIG. 3 is a transverse cross-sectional view through the retarder construction of FIG. 2; and FIG. 4 is a partial cross-sectional view illustrating a detail of a modified embodiment of a regulating valve.

Figure 1:
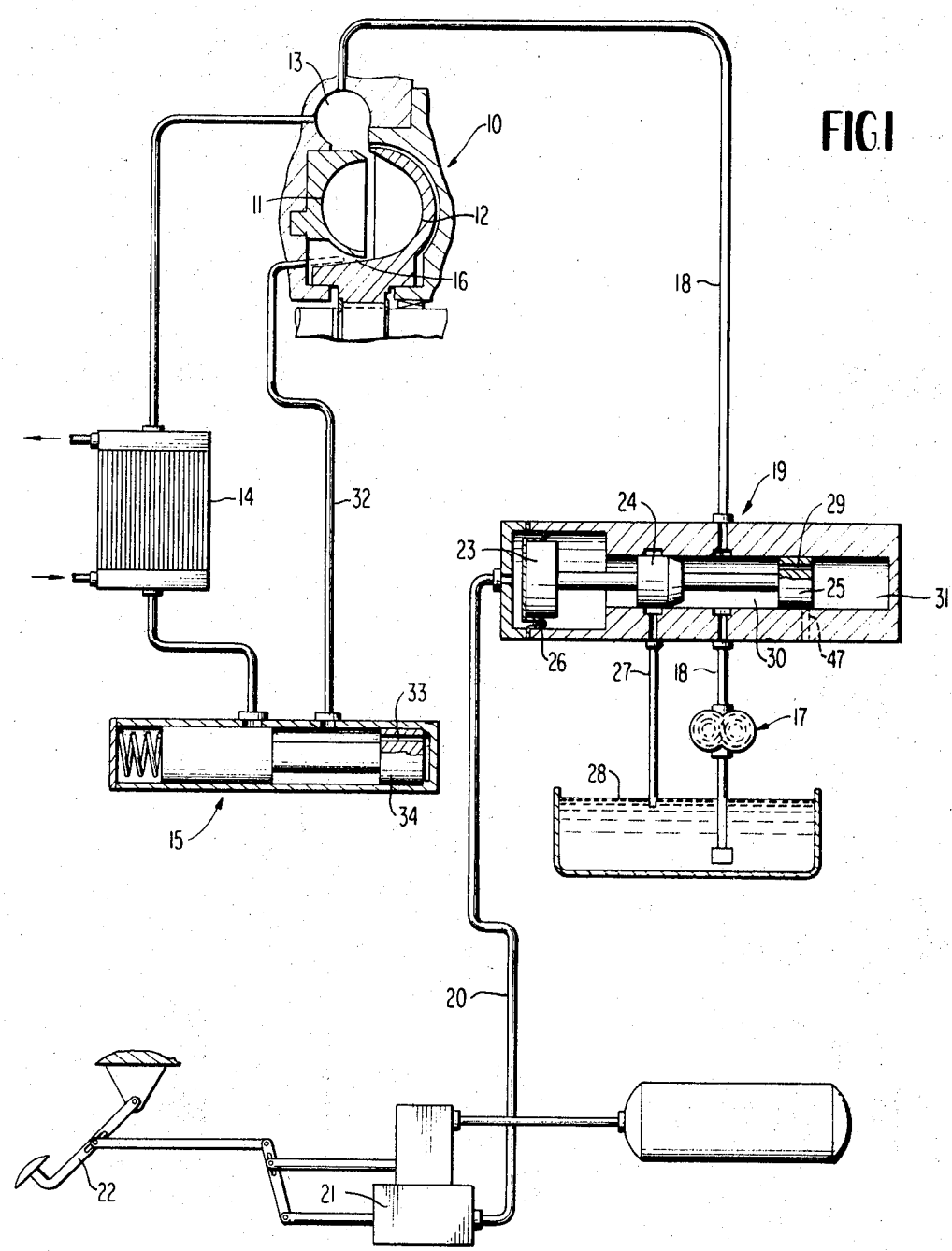
FIG. 1 is a schematic view of a retarder installation in accordance with the present invention.

Referring now to the drawing wherein like reference numerals are used throughout the various views to designate like parts, and more particularly to FIG. 1, the retarder generally designated by reference numeral 10 is constructed and bladed in the manner of a hydrodynamic coupling. It includes a fixed blade wheel 11 and a rotating blade wheel 12 rotating in unison with the drive shaft of the motor vehicle (not shown). A surrounding spiral 13 serves as discharge or outlet out of the retarder 10. A line leads from the spiral 13 to the cooler 14 and from there by way of a cut-off or closure valve generally designated by reference numeral 15 to the retarder inlet 16.

A filling pump generally designated by reference numeral 17 serves for the filling of the retarder 10, whose pressure line 18 leads to the retarder outlet 13 by way of a regulating valve generally designated by reference numeral 19. The regulating valve 19 is connected by way of a line 20 with a brake valve 21 which is operatively connected with the brake pedal 22.

The regulating valve 19 is constructed as piston slide valve and includes a first partial piston or spool 23, a second partial piston or spool 24 and a third partial piston or spool 25. The first partial piston 23 is provided with a roller diaphragm 26 and is acted upon on its end face by the pressure from the brake valve 21. The second partial piston 24 controls the return 27 to the oil sump 28. The third partial piston 25 is provided with a throttle bore 29 through which the pressure prevailing in the space 30 can be transmitted into the space 31 against the end face of the third partial piston 25.

With a non-actuated brake, the regulating valve 19 is in its left end position and the closure valve 15 in its right end position. The pump 17 thereby supplies directly from the space 30 into the return line 27 so that no pressure exists at the retarder outlet 13. The retarder 10 is therefore empty and the external circulatory system by way of the oil cooler 14 is closed. It is therefore impossible that oil continues to be sucked out of this external circulatory system and is fed back by the centrifuging effect of the retarder by way of the outlet 13 to the regulating valve 19 and from there by way of the return line 27 into the sump 28.

If the brake pedal 22 is actuated, then the piston slide valve of the regulating valve 19 moves toward the right corresponding to the pressure on its first partial piston 23. The second partial piston 24 thereby closes off the return 27 so that a pressure can build up in the space 30, by means of which the retarder 10 is filled by way of the outlet 13. The same pressure also builds up with a slight delay in the space 31 so that the regulating valve 19 then is held in the predetermined position. The excess supply quantity of the pump 17 flows into the return 27 by way of the control edge of the second partial piston 24.

A pressure has now built up in the retarder 10 which by way of the line 32 and the throttle bore 33 also becomes effective on the end face 34 of the piston slide valve within the closure valve 15 and thereby displaces the same into its left end position. As a result thereof, the external circulatory system by way of the oil cooler 14 is opened up so that the energy dissipated in the retarder 10 can be conducted away by means of the cooler 14.

If the pressure disappears at the brake valve 21, then the pressure within the space 31 at the regulating valve 19 presses the piston slide valve again into its left end position. The space 30 is thereafter relieved of the pressure and the retarder 10 centrifuges itself empty. If the pressure at the inlet 16 thereby drops below a predetermined value, then the closure valve 15 again closes the external circulatory system by way of the oil cooler 14 due to the spring action. If so desired, a bore 47 discharging to zero, may be so coordinated to the space 31 on the end face of the third partial piston 25 that it will be closed after a predetermined travel of the third partial piston 25.

According to FIGS. 2 and 3, both the retarder 10 as also the filling pump 17, the regulating valve 19 and the closure valve 15 are arranged in a common housing generally designated by reference numeral 35. The shifting takes place in principle as described in connection with FIG. 1. The cylinder space 36 (FIG. 3) which accommodates the first partial piston 23 of the piston slide valve serving as regulating valve, is provided with an elastic abutment 37. The closure valve 15 is arranged this time slightly differently. Its partial piston 38 is acted upon by a spring 39 and keeps closed the retarder inlet 16. The other partial piston 40 is acted upon by way of the bore 41 by the pressure at the cooler outlet. This pressure corresponds to the pressure at the retarder outlet 13 taking into consideration the line resistances.

According to FIG. 4, a pot-shaped additional piston 42 is coordinated to the third partial piston 25 of the regulating valve. This additional piston 42 is supported in the housing by means of a relatively weak spring 43 and the space 44 on its back side is relieved by way of the line 45 to zero. If the first partial piston 23 (not illustrated in this figure) receives pressure, then the entire piston slide valve member of the regulating valve 19 at first moves toward the right until the additional piston 42 comes into abutment. The return 27 is thereby closed immediately so that the retarder is filled. Only thereafter the pressure builds up by way of the throttle bore 29 in the space 46—which corresponds to the space 31 according to FIG. 1—and forces the piston slide valve member of the regulating valve 19 back into its regulating position.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A hydrodynamic brake for vehicles with a working circulatory system and with an external circulatory system as well as with at least one fixed blade wheel means and one rotatable blade wheel means operatively connected with a drive, which also includes a filling pump means for filling the hydrodynamic working circulatory system, characterized in that the hydrodynamic brake includes an inlet and an outlet, the filling pump means being operable to be selectively connected by way of a regulating valve with either an oil sump or the outlet of the hydrodynamic brake to fill the working circulatory system and to automatically regulate the pressure corresponding to the pressure in a brake circuit means of the vehicle, the external circulatory system being connected between the inlet and the outlet of the hydrodynamic brake and including a closure valve coordinated to the hydrodynamic brake for opening the external circulatory system of the hydrodynamic brake only above a predetermined pressure at one of the two places consisting of the inlet and the outlet of the hydrodynamic brake and for closing the external circulatory system below said predetermined value.

2. A hydrodynamic brake according to claim 1, characterized in that the hydrodynamic brake is provided with a single outlet and the regulating valve is provided with an outlet connected to the outlet of the hydrodynamic brake such that the hydrodynamic brake is filled by fluid passing through the regulating valve and to the outlet of the hydrodynamic brake.

3. A hydrodynamic brake according to claim 2, characterized in that the regulating valve is provided with another outlet connected to the oil sump such that in one position of the regulating valve fluid passes from the oil sump via the filling pump means into the regulating valve and returns to the oil sump.

4. A hydrodynamic brake according to claim 3, characterized in that the filling pump means includes a pump having a single outlet connected to an inlet of the regulating valve.

5. A hydrodynamic brake for vehicles with a working circulatory system and with an external circulatory system as well as with at least one fixed blade wheel means and one rotatable blade wheel means operatively connected with a drive, which also includes a filling pump means for filling the hydrodynamic working circulatory system, characterized in that the filling pump means is operable to be selectively connected by way of a regulating valve means with either an oil sump or the outlet of the hydrodynamic brake to automatically regulate the pressure corresponding to the pressure in a brake circuit means of the vehicle, and in that a closure valve means is coordinated to the hydrodynamic brake which is operable to open up the external circulatory system of the hydrodynamic brake only above a predetermined pressure at one of the two places consisting of inlet and outlet of the hydrodynamic brake and closes the same below said predetermined value.

6. A hydrodynamic brake according to claim 5, characterized in that the external circulatory system includes a cooler.

7. A hydrodynamic brake according to claim 6, characterized in that the brake is installed in a motor vehicle.

8. A hydrodynamic brake according to claim 5, characterized in that said closure valve means is coordinated to the inlet in the brake and is adapted to be acted upon, on the one hand, by a spring force and, on the other, by the pressure at said inlet.

9. A hydrodynamic brake according to claim 8, characterized in that the external circulatory system includes a cooler.

10. A hydrodynamic brake according to claim 9, characterized in that the closure valve means is constructed as piston slide valve, with two partial pistons, and in that a spring is disposed at the end face of one partial piston which closes a line from the cooler in the pressureless condition whereas the end face of the other partial piston is in communication by way of a throttle bore with the space between the two partial pistons which is in constant communication with the inlet of the hydrodynamic brake.

11. A hydrodynamic brake according to claim 5, characterized in that the regulating valve means is constructed as piston slide valve and includes a first partial piston adapted to be acted upon by a pressure depending on the pressure in the vehicle brake circuit means, a second partial piston controlling the return into the sump and a third partial piston adapted to be acted upon by the pressure at the outlet of the hydrodynamic brake.

12. A hydrodynamic brake according to claim 11, characterized in that the effective piston surface of the first partial piston of said regulating valve means possesses a differential surface with respect to the third partial piston.

13. A hydrodynamic brake according to claim 11, characterized in that a spring means is so coordinated to the first partial piston of said regulating valve means that a slight pressure is constantly maintained at the outlet of the hydrodynamic brake.

14. A hydrodynamic brake according to claim 11, characterized in that a bore means is so coordinated to the space on the end face of the third partial piston that it is adapted to be closed after traversal of a predetermined path by the third partial piston.

15. A hydrodynamic brake according to claim 11, characterized in that a spring loaded additional piston is arranged in the space on the end face of the third partial piston and in that the space disposed opposite to the third partial piston is discharged to zero.

16. A hydrodynamic brake according to claim 5, characterized in that the closure valve means is coordinated to the inlet of the hydrodynamic brake and is adapted to be acted upon against a spring force by the pressure existing at one of the two places consisting of a cooler outlet and of the outlet of the hydrodynamic brake.

17. A hydrodynamic brake according to claim 16, characterized in that the closure valve means is constructed as piston slide valve with two partial pistons whose one partial piston closes the inlet to the brake and whose other partial piston is adapted to be acted upon by the pressure at the cooler outlet by way of a bore.

18. A hydrodynamic brake according to claim 17, characterized in that the regulating valve means is constructed as piston slide valve and includes a first partial piston adapted to be acted upon by a pressure depending on the pressure in the vehicle brake circuit means, a second partial piston controlling the return into the sump and a third partial piston adapted to be acted upon by the pressure at the outlet of the hydrodynamic brake.

19. A hydrodynamic brake according to claim 18, characterized in that the effective piston surface of the first partial piston of said regulating valve means possesses a differential surface with respect to the third partial piston.

20. A hydrodynamic brake according to claim 19, characterized in that a spring means is so coordinated to the first partial piston of said regulating valve means that a slight pressure is constantly maintained at the outlet of the hydrodynamic brake.

21. A hydrodynamic brake according to claim 20, characterized in that a bore means is so coordinated to the space on the end face of the third partial piston that it is adapted to be closed after traversal of a predetermined path by the third partial piston.

22. A hydrodynamic brake according to claim 20, characterized in that a spring-loaded additional piston is arranged in the space on the end face of the third partial piston and in that the space disposed opposite to the third partial piston is discharged to zero.

* * * * *